June 10, 1969 A. TREHUB 3,449,585

AUTOMATIC RECOGNITION SYSTEM USING CONSTANT INTENSITY IMAGE BEARING LIGHT BEAM

Filed Feb. 15, 1966

INVENTOR.
ARNOLD TREHUB

BY Anster & Rothstein

ATTORNEYS 3,449,585

AUTOMATIC RECOGNITION SYSTEM USING CONSTANT INTENSITY IMAGE BEARING LIGHT BEAM

Arnold Trehub, 145 Farview Way, Amherst, Mass. 01002

Filed Feb. 15, 1966, Ser. No. 527,591
Int. Cl. G01n 21/22
U.S. Cl. 250—219 9 Claims

ABSTRACT OF THE DISCLOSURE

An automatic pattern recognition arrangement which maintains the intensity of an image-bearing light beam constant. The image-bearing light beam is developed from an unknown pattern and the beam intensity is maintained constant by a feedback control loop.

This invention relates to automatic recognition apparatus, and more particularly, to a recognition system for automatically performing an image-to-digital conversion whereby a coded signal individual to a sample plot, graph, photograph, or other graphic data to be identified is generated.

The area of pattern and plot recognition has always been one of great interest to scientists and researchers in many fields. Such recognition has for some time been a valuable tool for chemical analysts, who utilize this technique for spectroscopic and X-ray diffraction studies. Physicists and astronomers have been able to determine the component structure of distant celestial bodies by comparing spectrographs of the light emanating from these bodies with spectrographic patterns obtained from known substances.

With the increased emphasis on research in recent years, pattern recognition has been widely utilized in newer areas as well, with further applications becoming apparent as more fields are explored. Thus, for example, recognition systems have been considered for use in terrain analysis, space exploration, and character (i.e., printed or written letters, numbers, etc.) recognition, to name just a few.

Although this is clearly a burgeoning field, the problem of economically automating such recognition has generally not been adequately dealt with in the past. Some of the prior art recognition techniques are too approximate for the detailed and accurate analysis which is often required. In addition, certain attempts at automation have resulted in overly cumbersome and complex arrangements which are not suitable for use in the many smaller laboratories in which much valuable research work is done today.

To illustrate this situation, one prior art approach has been to use a "masking" technique which allows an image-bearing light beam to pass through a stencil-like mask which has been formed from a known plot. To identify an unknown pattern, a plurality of available and previously identified masks are sequentially placed in the path of the light beam and the transmitted light values are measured. Thus, a trial-and-error matching technique is used to determine which known mask best "fits" the unknown pattern. In this way, the unknown pattern is identified by its best "fitting" known mask. This technique is very often too approximate for many applications. On the other hand, if economy is sacrificed, accuracy can be achieved in image detection by employing a digital computer in the following manner. Variations in light intensity representing the unknown pattern are scanned point by point and converted at many points by means of an analog-to-digital converter to a long sequence of digital values. This sequence of digital values is then processed in a digital computer which compares the unknown sequence with known sequences previously stored in the computer memory. Even with this relatively rapid technique, results are often not immediately available. Furthermore, the computer equipment generally occupies a rather large physical space and is very costly, thus making this technique impractical for many research situations.

It is therefore an object of this invention to furnish an improved automatic recognition system to obviate one or more of the aforesaid difficulties.

It is another object of this invention to provide an accurate and yet economical recognition system which can be utilized to identify one of a large plurality of patterns.

It is also an object of this invention to automatically provide digital output signals related to an unknown pattern for purposes of comparison with a series of coded digital values of known patterns.

In one embodiment of the principles of this invention, the intensity of a light beam projected through an unknown pattern, for example a photographic transparency, is maintained at a constant value by a feedback control loop. The light beam is then transmitted through a beam-splitting device which divides the beam into several equal intensity images of the original pattern. It should be understood that such a splitting device is merely an illustrative manner of treating the projected light beam. Other arrangements to achieve the same purpose, such as sequential passage of the beam through different filters by a reciprocating or rotating device, will be apparent to those skilled in the art. Each of the split beams then passes through a separate filtering element. These filtering elements each have a different density or shading pattern which allows varying amounts of light to pass therethrough depending upon the particular density distribution of the filter. The light which emerges from each of the filters is then condensed and caused to impinge on separate photoelectric cells. Each of these cells generates an output voltage signal which is proportional to the total intensity of the light which impinged upon it from its associated condenser.

Each of the plurality of photoelectric cell voltage outputs is then fed into an analog-to-digital converter which produces a digital output signal which is individual to the original unknown pattern through which the original light beam was projected. Thus, an "image-to-digital conversion" of the unknown pattern is achieved. For a given series or class of patterns which are to be recognized, such as mass spectrograph plots, a given plot will generate the same digital output if the intensity of the light source, the filters, and the sensitivity of the photoelectric cells in each light path remain the same.

Assuming that the dimensions of the unknown transparency and the filters are the same, and considering a given point with the same coordinates on the transparency and on the filters (i.e., "homologous" points on the transparency and filter), the intensity of the light which emerges from this given point on the filter in any one of the light paths can be termed a light "cross-product." That is, the resultant intensity at that point is proportional to the product of the fractional light intensity passing through the given point on the transparency multiplied by the fractional light intensity passing through the same point on the filter. For example, if approximately the entire light intensity value is transmitted through the given point on the transparency, but only one-third of the light intensity passes through the point on the filter, then the cross-product for that point is equivalent to one-third of the original point intensity. The photoelectric cells in each light path effectively integrate the cross-products of the light which impinges upon the cell's sensitive surface and produce a single integrated output, in general an electrical signal.

To give an indication of the high degree of accuracy as well as of the potential extensiveness of this invention, assume that the original light beam is split into only two equal intensity sub-beams. Thus, each of the beams (as focused images) passes through a respective filter and condenser, thereupon impinging on a respective photoelectric cell. If the sensitivity of each photoelectric cell is such as to generate any one of one thousand voltage outputs, depending upon the total intensity of the light impinging on it, then each of the two illustrative cell output voltages will be one of a thousand different values. It therefore follows that the total number of possible combinations of these two outputs (e.g., the single digital output from the analog-to-digital converter) is the product of these two cell ranges, or one thousand times one thousand, resulting in one million different possible outputs.

The system can be arranged so that for any particular class of unknown patterns as mentioned above, a "data book" of digital output values relating to known patterns can be available for ready reference. All that a researcher would then be required to do to identify the origin of the unknown pattern would be to compare the digital output for his unknown pattern to the same coded digital output for a previously identified pattern in the data book. Of course, it is clear that the use of additional filters to furnish more than two photoelectric cell outputs would produce an even greater number of possible combinations, thereby further expanding the capabilities of the system. Moreover, the "data book" information can be readily and conveniently stored in the laboratory itself for rapid analysis.

It is therefore a feature of this invention that a light beam or sub-beams derived therefrom is passed through respective filters and activate at least one photoelectric cell to generate signal outputs proportional to the sum of the light intensity cross-products with respect to all points on an unknown pattern and each homologous point on the respective filters.

It is also a feature of this invention that a pattern recognition system utilizes a beam-splitting technique to produce a plurality of equal intensity light beams from a light source which has been projected through an unknown pattern so as to maintain the total projected intensity constant.

Another feature of this invention includes facilities for maintaining the intensity of a projected light beam constant by a feedback control loop.

Yet another feature of this invention is means for performing an image-to-digital conversion which includes generating a digital output signal from a plurality of voltage analog signals, so that the total available number of combinations of these outputs is equivalent to the product of the number of sensitivity levels of each of a plurality of photoelectric cells in a corresponding plurality of light beam paths.

The above brief description, as well as further objects, features, and advantages of the present invention, will be more fully appreciated by reference to the following detailed description of a presently preferred, but nonetheless illustrative embodiment demonstrating objects and features of the invention, when taken in conjunction with the accompanying drawing, wherein.

Figure 1:
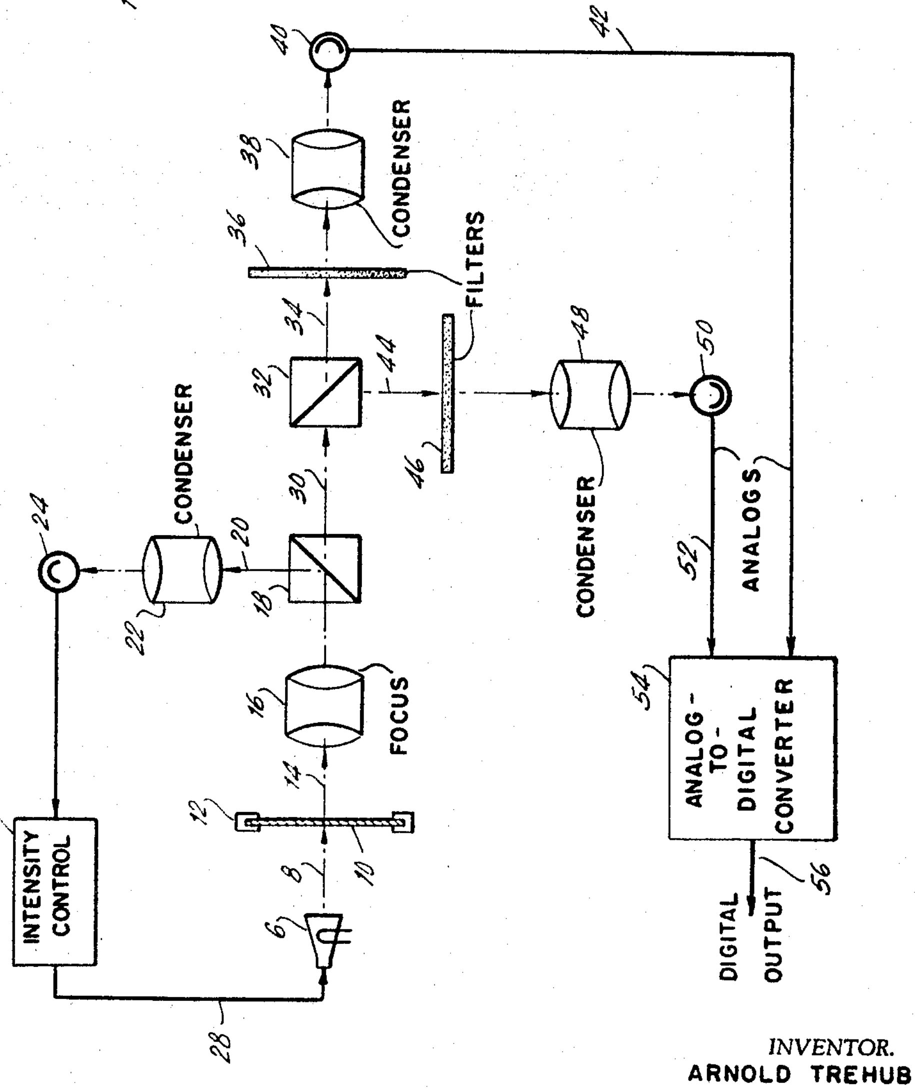
FIG. 1 is a block diagram of one illustrative embodiment of the invention showing an original light beam having been split into three light beams, one a feedback control beam and two "detection" beams.

The block diagram of FIG. 1 discloses an electro-optical system illustrating one manner of operation of the invention. The unbroken lines connecting various blocks indicate electrical signals, while the dashed lines indicate optical paths.

The identification procedure can be commenced by the insertion in the pattern holder 12 of a transparency 10 of an unknown pattern. Depending upon the type of illumination involved, the element 10 can also be a positive, a translucent sketch, an oscilloscope trace, etc. An illuminating source 6 which may illustratively be a projection lamp, projects a uniform beam of light 8 through the transparency 10. The unknown pattern of the transparency 10 will transmit certain portions of the light beam 8 and will partially or completely block the passage of other portions of the light beam, depending upon the precise pattern and shading involved. Thus, for example, the illustrative "unknown" pattern shown in FIG. 2 would tend to transmit light through the clear areas represented by point A, but most of the light impinging upon the transparency 10 in the lined areas (representative of a solid dark shade) between the irregular curve and the upper horizontal axis would be blocked. Again, depending upon the precise unknown pattern involved, various shadings in the unknown pattern could pass various quantities of the light beam 8 through the transparency.

The light beam 14 which emerges from the transparency 10 is focused by an illustrative focusing device 16, which may be any one of a number of well-known lens or similar optical arrangements. The focused beam is then arranged to impinge upon the inclined surface of a beam-splitting structure 18. Such beam splitters are also well known in the art and can constitute, merely by way of example, a semi-silvered mirror surface which deflects a portion of the impinging light beam and passes the remainder thereof.

The deflected beam 20 is optically concentrated by a condenser 22, which is also well known in the art and may illustratively take the form of a plurality of lenses. The condensed light beam is then caused to impinge upon the photo-sensitive surface of a photoelectric cell 24 arranged in optical relation to the condensed beam. As is well known, the output signal from a photoelectric cell may be a voltage proportional to the intensity of the input light beam to the cell. This proportional voltage output is fed electrically to an intensity control circuit 26 the purpose of which is to provide control over the feedback loop to maintain the total amount of light passing through beam-splitter 18 constant. Thus, intensity control circuit 26 may be of a well-known construction which provides an inverse control relationship such that if the input electrical signal thereto from photoelectric cell 24 increases or decreases, the resultant output control signal 28 respectively decreases or increases the intensity of light source 6. Such circuits are well known in the art.

As a result of the operation of the feedback control loop just described, the total amount of light passing through beam-splitting device 18 is maintained at a relatively constant value. This is an important aspect of the operation of the instant system, since the only legitimate variables introduced into the system should be the spatial distributions of the regulated quantity of light passed by various unknown pattern transparencies 10. For accurate matching of digital outputs to be described below, the intensity of the light beam 30 which emerges from the beam-splitting device 18 must be maintained constant.

The transmitted portion 30 of the light impinging upon beam-splitter 18 is then caused to impinge upon a second beam-splitter 32, which is generally similar to beam-splitter 18. For the purposes of this discussion, the beam-splitter 32 is shown as splitting the impinging light beam 30 into two light beams 34 and 44, each of which may be approximately equal in intensity. It will be understood by those skilled in the art that illustrating two sub-beams is merely one possible splitting arrangement, and that well-known optical devices can be used to subdivide beam 30 into additional pluralities of sub-beams.

A first optical filter 36 is placed in the path of a first transmitted sub-beam 34. Filter 36 is a variably shaded filter, well known in the optical art (often called a "density wedge"), and is shown diagramatically in FIG. 3. The pattern of dots which increases in concentration towards the bottom of FIG. 3 indicates a darker shading of filter 36 towards the bottom thereof. Thus, in general, greater quantities of light will be passed by the upper portion of filter 36 than by the lower portion. The precise quantity of light transmitted by the shading pattern of filter 36 need not be actually determined, but the filter shading pattern must be maintained constant in each of filters 36 and 46 respectively for a given determination of a known pattern and a subsequent matching of an unknown pattern.

The light beam which emerges from filter 36 is condensed by condenser 38 and caused to impinge upon the sensitive surface of photoelectric cell 40, thereby producing an electrical output such as a voltage signal on conductor 42. This signal, which is one of a relatively large plurality of possible output signals from the photoelectric cell 40, is an analog of the intensity of the light beam impinging upon the surface of the photoelectric cell 40. The signal on lead 42 is thence fed to the analog-to-digital converter 54.

The deflected light beam 44 from the beam-splitter 32 is transmitted through a second filter 46 which has a different shading pattern from that described above with respect to filter 36. For example, although of the same overall dimensions as filter 36, filter 46 may illustratively have a shading pattern which increases in optical density from the left to the right edges thereof. Thus, with relation to an impinging image for beam 44, more light would be transmitted through the left portion of filter 46 than through the right portion thereof.

Again, the emerging light beam is condensed by optical condenser 48 and the resultant light impinges on photoelectric cell 50. The output analog signal on conductor 52 is also fed to the analog-to-digital converter 54. The two analog signals on leads 42 and 52 are processed separately in analog-to-digital converter 54.

Analog-to-digital converters are well known in the art. They can be arranged, in a well-known manner, to receive one or more electrical signals and to generate therefrom a digital output signal such as the digital output 56 illustratively generated by the analog-to-digital converter 54 in FIG. 1. The digital output 56 can be a coded signal, representing the specific combination of inputs on leads 42 and 52, in any one of a plurality of well-known codes, such as binary, octal, decimal, etc.

To illustrate the analog-to-digital conversion approach to detecting, the converter 54 is arranged in a well-known manner to furnish a unique digital output 56 based upon the presence of analog inputs on leads 42 and 52. Thus, if the sensitivity of photoelectric cells 40 and 50 is such that one thousand different output voltage levels are possible based upon the variable intensity of the respective impinging light beams, the voltage signal on lead 42 will be one of a possible one thousand different voltages within a given range, and the voltage signal on lead 52 will similarly be one of a possible one thousand different voltage levels also within a given voltage range. The analog-to-digital converter 54 is arranged to recognize the particular voltage signals on each of leads 42 and 52 and to generate therefrom a unique digital output 56 representative of the analog input signals. The appropriately coded digital output 56 can then be compared to a list or book of similarly coded and previously determined outputs based upon the density distribution in holder 12 of known patterns, the digital outputs for which were determined with the same light source 6 and filters 36 and 46. The final identification step would then involve merely noting in the prepared list a multi-digit coded number, for example, with the same digital values as those of the unknown pattern. When such an identification has been made, the unknown pattern has been identified as equivalent to the previous known pattern with the same coded representation. It will be appreciated that a digital output may also be utilized to activate any of a plurality of code-responsive equipment in a manner well known in the art.

Figure 2:
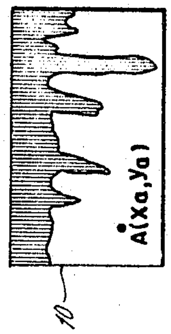
FIG. 2 is a sample illustrative "unknown" pattern which can be used to generate a digital output by the embodiment of the invention as shown in FIG. 1.
Figure 3:
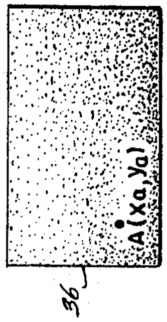
FIG. 3 is one illustrative rendering of the shading for the filter elements used in the embodiment shown in FIG. 1.

A brief qualitative mathematical analysis of the system's operation involves observing the relative light intensities at a given point whose coordinates are the same on both the unknown transparency and on each of the respective filters. A typical "homologous" point is point A, with rectangular coordinates ($x_a$, $y_a$) as indicated in FIGS. 2 and 3 with respect to the unknown transparency and filter 36. It is noted that the overall dimensions of the unkown transparency 10 and of the filter 36 are the same, to facilitate this coordinate analysis.

Since point A is located in a clear portion of the unknown transparency 10, it shall be assumed that all of the light which impinges on that point from light beam 8 in FIG. 1 is transmitted "through" that point into resultant light beam 14. Thus, it can be stated that the contribution to the "cross-product" (normalized quantities of light passing through points on the unknown and on the filter) by the light passing through point A on transparency 10 is effectively unity or 100 percent.

With respect to filter 36, however, point A is seen to be located in the relatively more dense lower area thereof. Thus, less light passes through the homologous point A on filter 36, and it is assumed that this amount is one-third of the light which impinges on filter 36 from light beam 34. Therefore, since the cross-product contribution of filter 36 with respect to point A is one-third, the resultant normalized cross-product for point A is 1 multiplied by one-third, or one-third. A similar analysis with respect to the homologous point A on filter 46 can be performed, with a different resultant cross-product.

Since photoelectric cells 40 and 50 effectively perform an optical-mathematical integration of the cross-products between all points of the transparency 10 and the homologous points on the various filters 36 and 46, the following steps can be recited:

*Symbols*

$i_A$: the contribution to the light intensity impinging on a photoelectric cell (such as 40 and 50) due to the passage of the light through point A;

$I_{A1}$, $I_{A2}$: the total light intensity impinging on a photoelectric cell (such as 40 and 50) due to the overall contribution of all points A with all coordinates within the dimensions of the specimen 10 and the filters 36 and 46 for example;

L: the intensity of the light source 6;

$P_A$: the cross-product contribution to the intensity impinging upon a photoelectric cell (such as 40 or 50) by virtue of light passing through a point such as A on the unknown transparency 10;

$F_{A1}$: the cross-product contribution to the intensity impinging upon a photoelectric cell (such as 40) by virtue of light passing through a point such as A on a first filter (such as filter 36) in the optical path of a first one of a plurality of split light sub-beams (such as beam 34 in FIG. 1).

$F_{A2}$: the cross-product contribution to the intensity impinging upon a photoelectric cell (such as 50) by virtue of light passing through a point such as A on a second filter (such as filter 46) in a second one of a plurality of split light sub-beams (such as beam 44 in FIG. 1).

$$i_A = L(P_A \cdot F_{A1})$$

(1)
$$I_{A1} = L \sum_{A=1}^{A=n} P_A \cdot F_{A1}$$

Similarly (2)
$$I_{A2}=L\sum_{A=1}^{A=n}P_A\cdot F_{A2}$$

The photoelectric cells 40 and 50, as previously mentioned, each effectively integrate all the input cross-products presented to their sensitized surfaces. Thus, photoelectric cell 40 generates the integral sum corresponding to expression number (1) above, while photoelectric cell 50 achieves the same with respect to the expression number (2) above. The analog versions of each of these integral results are electrical signals on leads 42 and 52 respectively, and the digital output 56 is a coded signal unique to the presence of the particular analog integral values of the signals on leads 42 and 52.

It is of course clear that an even more accurate system can be developed along the lines suggested herein if an additional plurality of filters with variable densities are utilized, with a corresponding plurality of split sub-beams. For detection and subsequent identification purposes, all that would be required is to maintain the identical filters for all codings and identifications within any given series of patterns constant.

It is to be understood that the above-described arrangements are illustrative of the application of the principles of the invention. Numerous other arrangements may be devised by those skilled in the art without departing from the spirit and scope of the invention.

What is claimed is:

1. A system for recognizing patterns comprising a regulated light source, light control means in the optical path of an image-bearing light beam defined by one of said patterns for varying the light intensity of said light beam, feedback means to said light source for maintaining constant the intensity of said image bearing light beam, means responsive to said light intensity to generate an output signal, and means for converting said output signal to a coded indication unique to said one of said patterns.

2. A system in accordance with claim 1 wherein said feedback means includes a feedback loop for regulating said light source comprising means for deflecting a portion of said light beam, means for condensing said deflected portion of said light beam, photoelectric means for generating a control signal proportional to the intensity of said deflected portion of said light beam, and control means responsive to said control signal for varying the intensity of said light source to maintain the intensity of said light beam constant.

3. A system in accordance with claim 1 wherein said converting means includes an analog-to-digital converter and said intensity responsive means includes a photoelectric cell.

4. A system in accordance with claim 1 wherein said light control means includes a plurality of optical filters.

5. A system in accordance with claim 4 wherein said light control means further includes means for splitting said light beam into a plurality of subsidiary light beams, and wherein the optical path of each of said subsidiary light beams includes one of said filters and a condenser.

6. A recognition system for identifying an unknown pattern from a plurality of previously observed patterns comprising an illuminating source; deflecting means for splitting the light beam projected through one of said unknown patterns into a plurality of sub-beams; feedback means to said illuminating means for maintaining constant the intensity of said light beam projected through said one of said unknown patterns; optical paths for each of said sub-beams including a variable density filter, electro-optical means and focusing means for concentrating the intensity of each of said sub-beams on said electro-optical means; and output means responsive to signals from each of said electro-optical means for generating an output representative of said one of said unknown patterns.

7. A recognition system in accordance with claim 6 wherein each of said signals from said electro-optical means represents the summation of optical cross-products between points on said one of said unknown patterns and points of corresponding coordinates on each of said variable density filters, and said output means includes means for converting said summation signals to digitally coded data unique to said one of said unknown patterns.

8. The method of identifying an unknown pattern consisting of the steps of developing an image-bearing light beam of said unknown pattern, maintaining the total intensity of said image bearing light beam constant, passing said image bearing light beam through a plurality of variable density filters, photoelectrically integrating the cross-products of light intensity at homologous points on said pattern and on each of said filters, converting the plurality of signals from said photoelectric integration into a coded output, and matching said coded output with an identical coded representation of a known pattern, said coded output and coded representation being determined with identical filters and said constant total intensity projected light.

9. The method of claim 8 wherein said passing step includes the step of splitting said image bearing light beam into a plurality of sub-beams for optical presentation to respective ones of said filters.

References Cited

UNITED STATES PATENTS

| | | | |
|---|---|---|---|
| 2,934,653 | 4/1960 | Holst | 250—217 |
| 3,215,843 | 11/1965 | Neil | 250—205 |
| 3,215,848 | 11/1965 | Zworykin | 340—146.3 X |
| 3,328,585 | 6/1967 | Briguglio | 250—217 |
| 3,255,436 | 6/1966 | Gamba | 340—146.3 |
| 3,274,380 | 9/1966 | Moskowitz | 340—146.3 X |

WALTER STOLWEIN, *Primary Examiner.*

U.S. Cl. X.R.

250—205, 209; 340—146.3